(12) United States Patent
Kahle

(10) Patent No.: US 9,453,729 B2
(45) Date of Patent: *Sep. 27, 2016

(54) LAYOUT EQUIPMENT AND LAYOUT METHOD

(71) Applicant: Trimble Navigation Limited, Sunnyvale, CA (US)

(72) Inventor: Kent Kahle, Hayward, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,978

(22) Filed: Jul. 31, 2014

(65) Prior Publication Data

US 2014/0338206 A1    Nov. 20, 2014

Related U.S. Application Data

(63) Continuation of application No. 13/452,087, filed on Apr. 20, 2012, now Pat. No. 8,826,553.

(51) Int. Cl.
*G01C 5/02* (2006.01)
*G01C 15/06* (2006.01)
*G01C 15/00* (2006.01)

(52) U.S. Cl.
CPC .............. *G01C 5/02* (2013.01); *G01C 15/004* (2013.01); *G01C 15/006* (2013.01); *G01C 15/06* (2013.01)

(58) Field of Classification Search
CPC ...... G01C 5/02; G01C 15/06; G01C 15/006; G01C 15/004
USPC .................................................. 33/290, 293
See application file for complete search history.

(56) References Cited

U.S. PATENT DOCUMENTS

| | | | |
|---|---|---|---|
| 3,790,277 A | 2/1974 | Hogan | |
| 4,820,041 A | 4/1989 | Davidson et al. | |
| 4,899,452 A | 2/1990 | Schafer | |
| 5,977,534 A | 11/1999 | Green et al. | |
| 6,076,267 A | 6/2000 | Gotoh | |
| 6,085,452 A | 7/2000 | Davis | |
| 6,167,629 B1 | 1/2001 | Chiba | |
| 7,434,322 B2 | 10/2008 | Walser et al. | |
| 7,644,505 B2 | 1/2010 | Zeng et al. | |
| 7,913,405 B2 | 3/2011 | Berg et al. | |
| 8,281,495 B2 | 10/2012 | Hayes et al. | |
| 8,539,685 B2 | 9/2013 | Amor | |
| 8,826,553 B2 * | 9/2014 | Kahle | G01C 15/06 33/290 |
| 2007/0017111 A1 | 1/2007 | Hoback et al. | |
| 2012/0195060 A1 | 8/2012 | Gregory et al. | |

* cited by examiner

*Primary Examiner* — Christopher Fulton
(74) *Attorney, Agent, or Firm* — Kilpatrick Townsend & Stockton LLP

(57) ABSTRACT

Layout equipment for locating a plurality of positions at a construction site is provided. The layout equipment includes a laser target rod, a self-leveling laser transmitter, and a remote control device. The rod has an elongated rod body including retroreflective material extending substantially the entire length of the body. The laser transmitter projects a beam of laser light, and receives laser light reflected from the rod. The laser transmitter includes a first wireless communication unit, and a transmitter control. The transmitter control is responsive to the first wireless communication unit. The remote control device includes a second wireless communication unit that communicates wirelessly with to the laser transmitter to cause the laser transmitter to project the beam of laser light toward a position at the construction site, and signals the user of the layout equipment when the rod has been placed at the position.

17 Claims, 6 Drawing Sheets

LAYOUT EQUIPMENT AND LAYOUT METHOD

CROSS-REFERENCE TO RELATED APPLICATIONS

This application is a continuation application of and claims the benefit of co-pending U.S. patent application Ser. No. 13/452,087 filed on Apr. 20, 2012 entitled "IMPROVED LAYOUT EQUIPMENT AND LAYOUT METHOD" by Kahle, the contents of which are incorporated herein, and assigned to the assignee of the present application.

STATEMENT REGARDING FEDERALLY SPONSORED RESEARCH OR DEVELOPMENT

Not Applicable.

BACKGROUND

Laying out construction sites, both inside buildings and outdoors, is often performed manually with tape measures. Right angles may be developed using a 3-4-5 triangle method, although a theodolite can also be used. While more sophisticated equipment is available for layout work, such as total stations and robotic total stations which project a beam of laser light to a target, such equipment is cost prohibitive in many settings. Further, such equipment provides an accuracy that is not needed for much rough layout work. Using tape measures and a theodolite, on the other hand, is tedious and time consuming, requiring several workers, and adding to the cost of the layout operation. Measuring previously constructed buildings and other structures to determine the positions of various features can also be difficult and time consuming. It will be appreciated that there is a need for less expensive layout equipment which can be operated by a single worker to accomplish layout operations, and also to take measurements of previously constructed buildings.

SUMMARY

Layout equipment for locating a plurality of positions at a construction site includes a laser target rod, a laser transmitter, and a remote control device. The laser target rod has an elongated rod body. Retroreflective material is provided on the rod body. The retroreflective material extends substantially the entire length of the rod body. Scale markings visible are provided on the laser target rod. The laser transmitter projects a beam of laser light, and receives laser light reflected from the laser target rod. The laser transmitter includes a wireless communication unit, and a transmitter control that is responsive to the wireless communication unit. The remote control device includes a wireless communication unit for wirelessly communicating with the laser transmitter to cause the laser transmitter to project the beam of laser light toward a selected one of the plurality of positions at the construction site, and for signaling the user of the layout equipment when the rod has been placed at the selected one of the plurality of positions. The beam of laser light may be a collimated beam of green laser light. The laser transmitter may be self-leveling, or manually leveled.

The laser transmitter may project a second beam of laser light parallel to the beam of green laser light. The second beam of laser light may also be reflected from the rod and detected by the transmitter, such that the distance between the laser transmitter and the rod may be determined through time-of-flight calculation. The second beam of laser light may be a collimated beam of red laser light.

The transmitter may illuminate the laser target rod as the rod is moved to different locations at the construction site. The transmitter control determines the heading and distance from the transmitter to the laser target rod, and the transmitter control communicates this information to the data device. The transmitter sweeps the beam of laser light horizontally back and forth across the rod surface, such that the position of the rod may be monitored as the rod is moved across the construction site. The scale markings on the laser target rod may specify distances of the scale markings with respect to one or both ends of the rod.

The remote control device may wirelessly communicate to the laser transmitter an instruction for the laser transmitter to direct the beam of green laser light along a heading toward a position at the construction site. The remote control device may further provide an indication when the laser target rod is located at the position.

A layout method for locating a plurality of positions at a construction site, may include transmitting wirelessly an instruction to a laser transmitter from a remote control device, identifying a position to be located, projecting a beam of green laser light and a parallel beam of red laser light from the laser transmitter toward the position to be located, placing a retroreflective target rod in the paths of the beam of green laser light and the beam of red laser light, the retroreflective target rod having retroreflective material over substantially the entire length of the rod, and sensing the reflection of the beams to the transmitter. The layout method further includes transmitting wirelessly to the remote control from the laser transmitter an indication that the target is in the path of the beams, transmitting wirelessly to the remote control from the laser transmitter the distance between the transmitter and the target rod and the distance between the transmitter and the position to be located, moving the retroreflective target rod toward the position to be located, and transmitting wirelessly to the remote control from the laser transmitter an indication that the target rod is located at the position to be located.

The method may further include determining the distance between the transmitter and the target rod based on the time of flight of the beam of red laser light. The method may further include transmitting wirelessly instructions to the laser transmitter from the remote control device, identifying additional ones of the plurality of positions, and moving the retroreflective target rod to the additional ones of the plurality of positions using the beams from the laser transmitter to direct such movement and to confirm that the retroreflective target rod is located at each of the additional positions. The transmitter may sweep the beams of laser light back and forth horizontally across the rod surface such that the position of the rod may be monitored as it is moved across the construction site. The layout method may further include using scale markings on the laser target rod to specify distances of the scale markings with respect to one or both ends of the rod. The remote control device may wirelessly communicate to the laser transmitter an instruction for the laser transmitter to direct the beam along a heading toward a location at the construction site, and the data device may provide an indication when the laser target rod is positioned at the location.

The laser target rod includes an elongated rod body, and retroreflective material on the rod body. The retroreflective material extends substantially the entire length of the rod body. Scale markings are visible on the laser target rod. The scale markings extend substantially the entire length of the rod body. The scale markings on the laser target rod specify distances of the scale markings with respect to one or both ends of the rod.

Layout equipment for determining the position of a target rod at a construction site may include a laser target rod, a transmitter for projecting a beam of laser light, and a remote control device. The laser target rod has an elongated rod body including retroreflective material on the rod body. The retroreflective material extends substantially the entire length of the rod body, and may include a plurality of strips of such material. Scale markings are provided and visible on the laser target rod. The transmitter projects a beam of green laser light, and receives laser light reflected from the laser target rod. By this arrangement, the area of illumination of the laser target rod may be observed by an operator. The laser transmitter includes a unit for measuring the distance to the target rod through a time of flight calculation. The laser transmitter includes a wireless communication unit, and a transmitter control. The transmitter control is responsive to the wireless communication unit. The laser transmitter further includes an infrared laser providing a beam of infrared laser light and an infrared receiver for detecting the reflection of infrared light from the retroreflective material on the laser target rod such that the infrared beam of laser light and the beam of green laser light are continuously directed to the laser target rod. The remote control device includes a wireless communication unit, for wirelessly communicating with the laser transmitter.

Layout equipment for determining the position of a target rod at a construction site may include a laser target rod, a transmitter for projecting a beam of green laser light, and a remote control device. The laser target rod has an elongated rod body including retroreflective material on the rod body, the retroreflective material extending substantially the entire length of the rod body, and scale markings visible on the target rod. The laser transmitter includes a wireless communication unit, and a transmitter control, responsive to the wireless communication unit. The laser transmitter further includes a camera for tracking the image of the laser target rod such that the beam of green laser light is continuously directed to the laser target rod. The transmitter may also include an infrared laser for providing a beam of infrared laser light to illuminate the target rod.

DETAILED DESCRIPTION OF THE PREFERRED EMBODIMENTS

Figure 1:
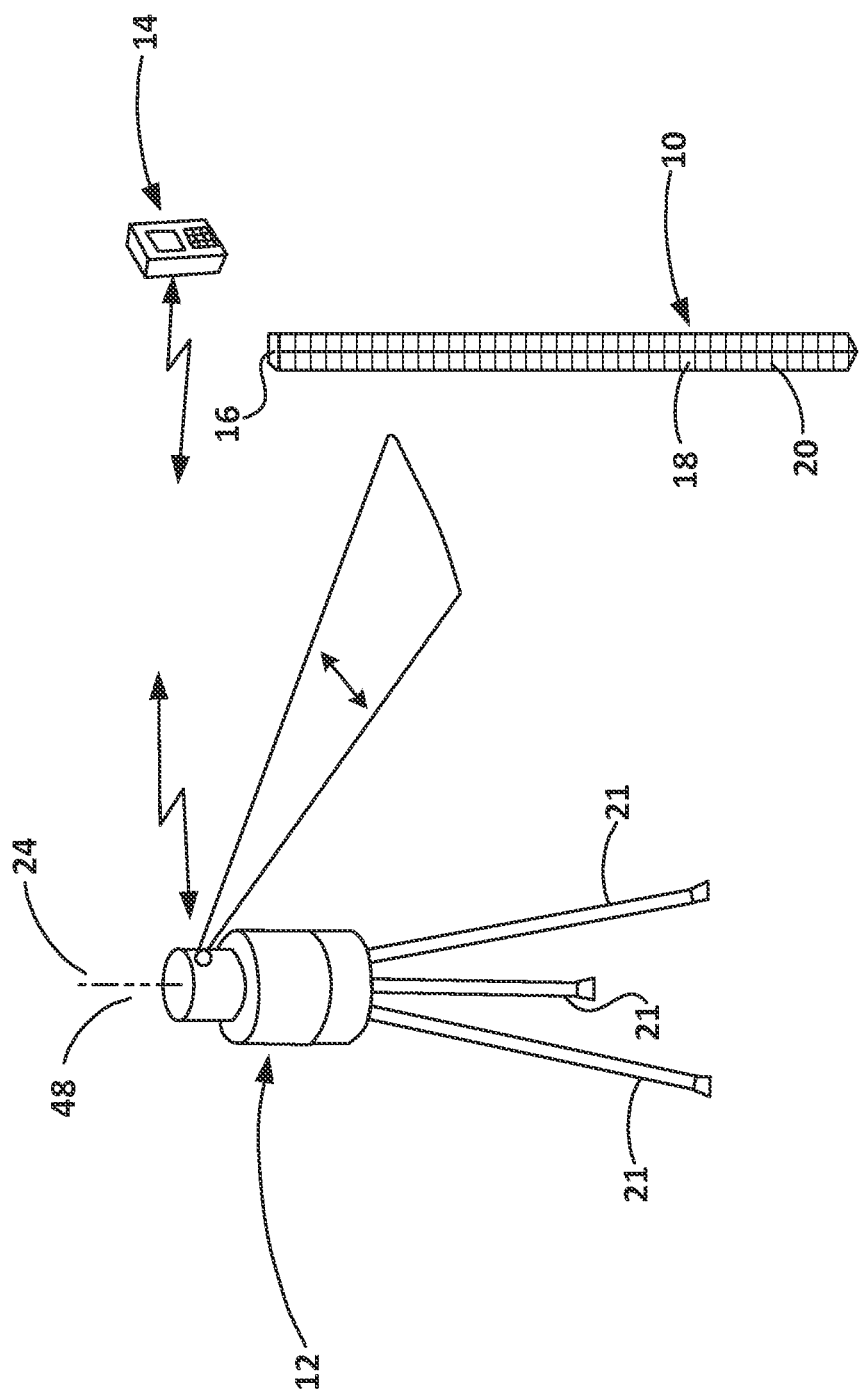
FIG. 1 is a perspective view, illustrating an embodiment of the layout equipment.
Figure 2:
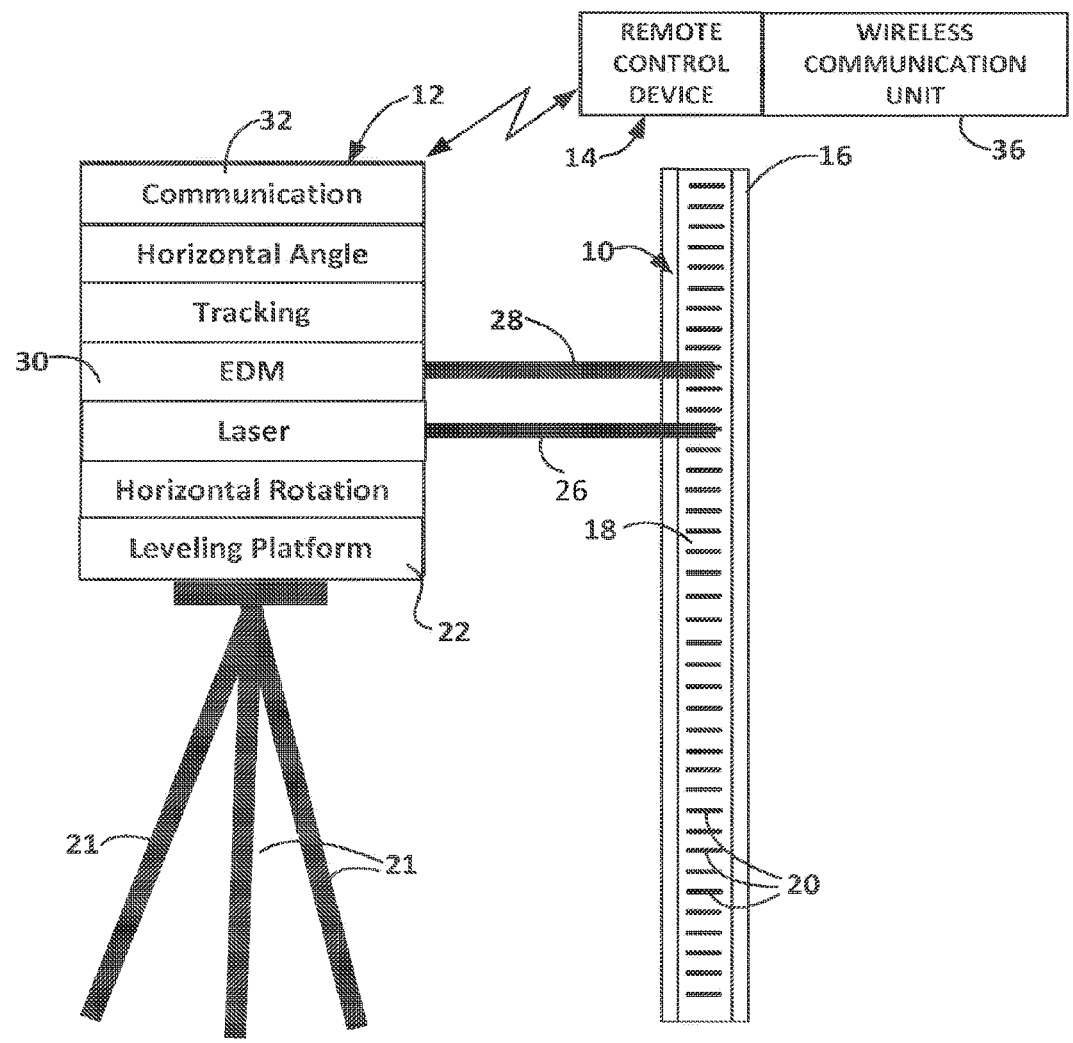
FIG. 2 is a diagrammatic illustration of the embodiment of FIG. 1.

FIGS. 1 and 2 show a first embodiment of the layout equipment which may be used by a single worker to perform rough layout of a construction site, quickly laying out a plurality of positions at the site, or measuring a number of positions at the site. This equipment is suitable for use indoors or outside at the construction site. The equipment includes a laser target rod 10, a laser transmitter 12, and a remote control device 14. The laser target rod 10 has an elongated rod body 16, and includes retroreflective material 18 on the rod body 16. The retroreflective material may be a retroreflective tape of the type having a coating including small retroreflective beads that adhere to the surface of the tape. As will be noted, the retroreflective material 18 extends substantially the entire length of the rod body 16. As a consequence, light striking the target rod 10 anywhere along its length will be reflected back toward the source of the light. As will also be noted, the laser target rod 10 carries scale markings 20 that are printed over the retroreflective material 16 and that extend substantially the entire length of the target rod 10. The scale markings 20 on the laser target rod 10 delineate distances of the scale markings with respect to one or both ends of the rod.

The laser transmitter 12 may be a self-leveling laser transmitter for projecting a beam of laser light horizontally. Alternatively, the laser transmitter 12 may be provided with an adjustable mounting for manually leveling the transmitter. The transmitter 12 receives laser light reflected from a target and determines the distance between the transmitter and the target and the heading to the target. As illustrated in FIG. 2, the transmitter 12, supported on tripod legs 21, includes a self-leveling platform 22 which automatically levels the transmitter, resulting in a vertical axis 24 about which the horizontal beams 26 and 28 can be rotated. As shown in FIG. 2, the laser transmitter 12 projects the two, parallel beams of laser light. A first laser beam 26, which is green in color for maximum visibility when it illuminates the target rod 10, and a second beam 28, which is typically red in color, are projected from the transmitter 12, and reflected back to the transmitter 12 from the rod 10. Beam 23 is used by a time-of-flight calculation circuit 30 (EDM) in the transmitter 12 to calculate the distance between the transmitter 12 and rod 10 on a time-of-flight basis. Both beams 28 and 26 are collimated laser light, but usually only the green beam 26 can be seen by the equipment user due to the bright ambient light conditions that are typical of a construction site.

Figure 3:
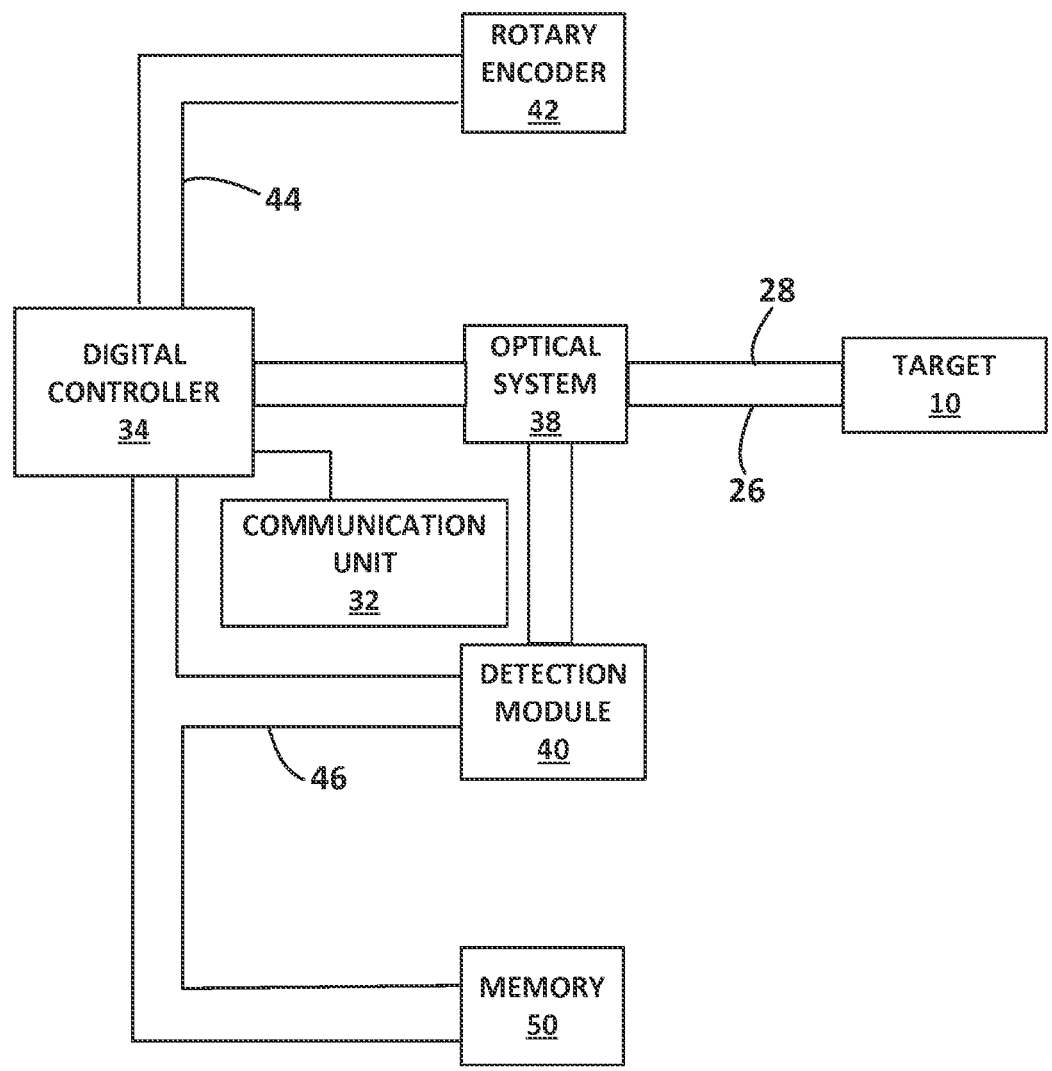
FIG. 3 is a schematic diagram, showing the control for the layout equipment.

As shown in FIG. 3, the laser transmitter 12 includes a wireless communication unit 32, and a transmitter control 34, responsive to the wireless communication unit 32, for communicating wirelessly with the remote control device 14. The remote control device 14 includes wireless communication unit 36 for wirelessly communicating with the laser transmitter 12 to cause the laser transmitter 12 to project the beams of laser light 26 and 28 in a heading toward a selected position. For example, the transmitter 12 is initially precisely located at a construction site, both as to position and heading, with the elevation of the projected horizontal beam accurately assessed. The remote control 14 may be used to direct the transmitter to project the beams toward a selected one of a plurality of positions at the construction site defining a concrete pouring form. The remote control 14 will typically signal the user of the layout equipment when the rod 10 has been properly placed at the selected position. The transmitter 12 illuminates the laser target rod 10 as the ran is moved by the operator to different locations at the construction site. By determining the heading and the distance of the rod 10 from the transmitter 12, the location of the rod 10 is precisely determined by digital controller 34. This information is then communicated to the remote control device 14.

As seen in FIG. 3, the optical system 38 receives the light from beams 26 and 28 which is reflected back from the target 10. The return of the light is detected by module 40 and this information, along with the output form rotary encoder 42, indicating the heading of the returning light, is supplied over lines 44 and 46 to digital controller 34. The computed location of the target 10 is then transmitted by communication unit 32 to remote control device 14, which is typically carried by the operator. To permit operation of the equipment by only one person, the transmitter includes the capability of tracking the position of the target rod 10, as the operator moves the rod about the work site.

When the transmitter 12 is initially turned on, it rotates the laser beams 26 and 28 about vertical axis 48 until the transmitter senses the reflection of the laser beams from the rod 10. The transmitter 12 then terminates the beam rotation and directs the beams directly at the target rod 10. When the loss of light returning to the transmitter 12 indicates that the rod 10 is being moved, the transmitter begins to dither the beam, i.e., rotating the beam back and forth horizontally through a relatively narrow angle about the vertical axis 48. This will cause the transmitter to reacquire the target 10. The dithering will be continued with the rod 10 being kept in the center of the dither path until the movement of the rod 10 stops. As a consequence, the operator can carry the laser target 10 about the construction site, while the transmitter continuously receives laser light reflected from the laser target 10. The controller 44 then continuously determines the heading and range of the target rod 10 from the transmitter 12. This information can be continuously transmitted wirelessly to the remote control device 14 via the communication unit 32 and the communication unit 36. The worker carrying the rod 10 observes the illumination point of the green beam on the rod 10 in relation to the scale markings 20, giving him the relative elevation of one or both of the ends of the rod 10 with respect to the reference beams of laser light. It will be appreciated that it is assumed that the worker holds the rod 10 vertically during this process.

Figure 7:
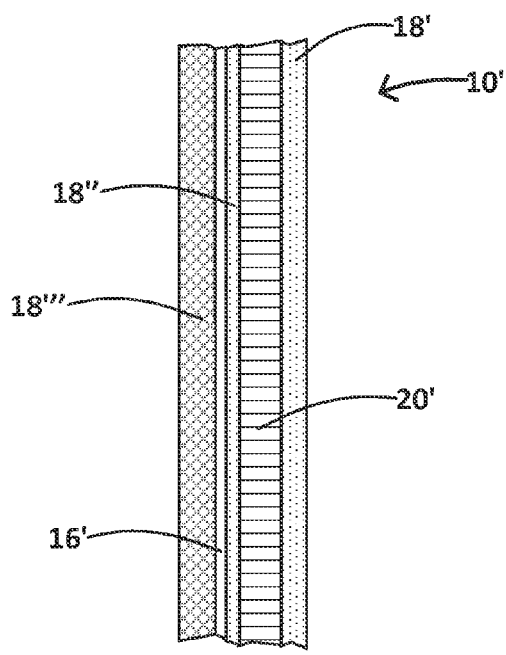
FIG. 7 is an enlarged view of a portion of a different embodiment of the laser target rod.

FIG. 7 illustrates a variation in the construction of the laser target rod 10'. The laser target rod 10', only a portion of which is illustrated has an elongated body 16, and includes several strips of retroreflective material 18', 18" and 18'''. As with the previously discussed laser target rod 10, the retroreflective material 18', 18" and 18''' may be strips of retroreflective tape which extend the entire length of the rod body 16. As a consequence, light striking the target rod 10' as it is swept across the target rod 10' by a laser transmitter 12 is reflected back to the laser transmitter 12. Rather than being reflected back to the laser transmitter as a single pulse of light, however, light returning from laser target rod 10' will return as three short pulses of light, with the middle pulse being of lesser duration than the duration of the first or the last pulse. It will be appreciated that this unique pattern of light will provide a basis for the transmitter 12 to distinguish the light reflected from laser target rod 10' from light reflected from other reflective or retroreflective surfaces. As a consequence, the laser transmitter will not lock onto other targets or surfaces, but will recognize the light returning from the laser target rod 10' and will remain locked on to rod 10.

Figure 4:
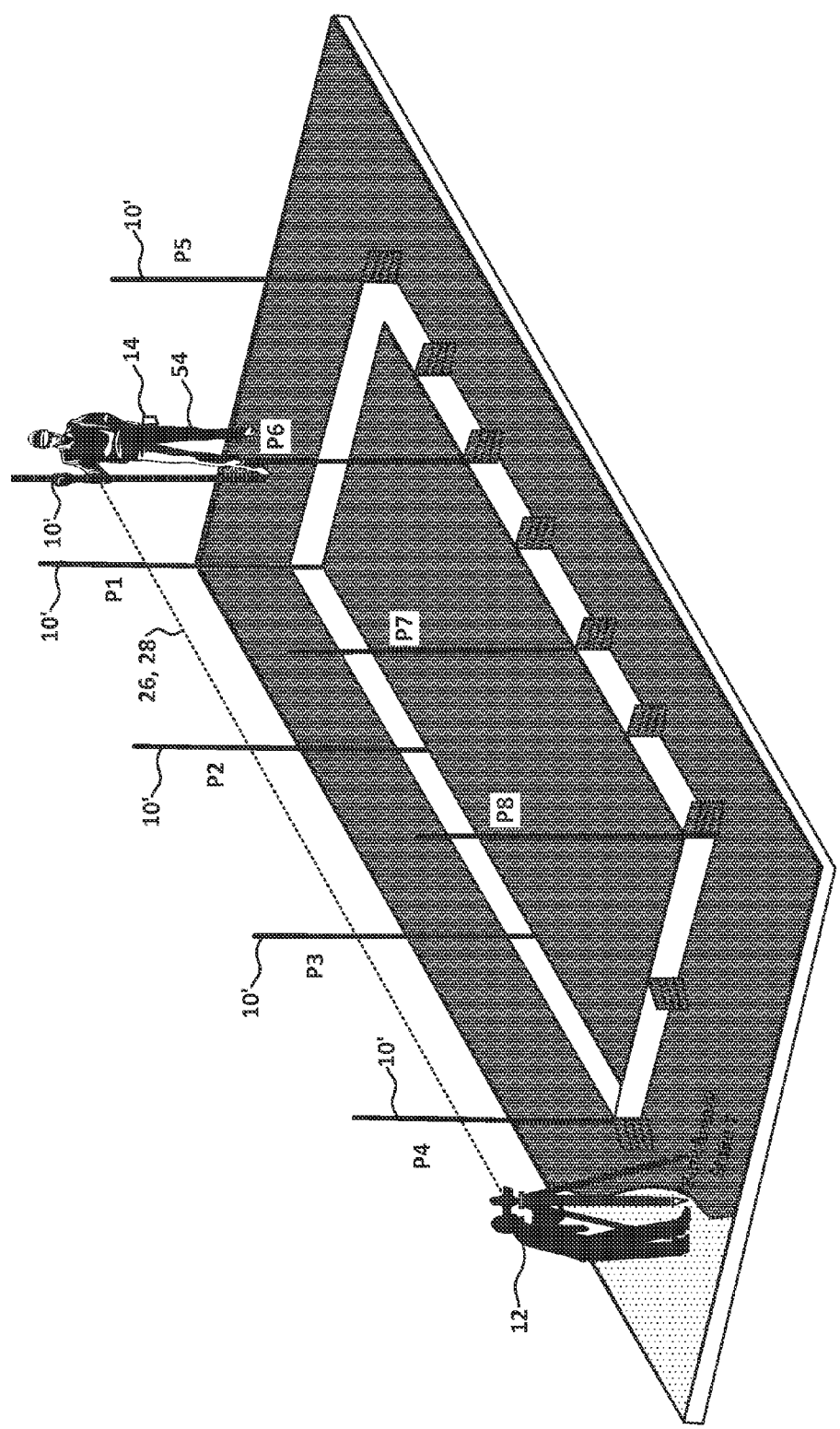
FIG. 4 illustrates a layout operation using the layout equipment of FIG. 1.

The layout operation may typically consist of locating a series of positions at the construction site. The remote control device 14 allows the operator to communicate wirelessly with the laser transmitter 12, transmitting an instruction to the laser transmitter to direct the beam of laser light 28 along a heading toward a first position at the construction site. The positions to be laid out may be stored in memory 50, associated with the transmitter 12, or may be stored in memory in the remote control device 14. When the rod 10 is successfully moved to the first position P1, the remote control device 14 provides an indication of this, so that this position can be marked or staked on the construction site. This is illustrated in FIG. 4, with the rod 10 being shown at each of the positions P1-P8, and referenced as 10'. FIG. 4 shows an operator 54, positioning target rod 10 for the layout of an additional point, and having remote control device 14 for remotely controlling the operation of the transmitter 12.

The layout method for locating a plurality of positions at a construction site using the layout equipment described above contemplates the operator transmitting wirelessly an instruction to the laser transmitter 12 from the remote control device 14, identifying in turn each of the plurality of positions. Initially, the laser transmitter is precisely positioned and oriented at the construction site. A beam 26 of green laser light and a parallel beam 28 of red laser light are then projected from the laser transmitter 12 in a heading toward the position to be located. It will be appreciated that the beam will actually be elevated above the position to be located and pass over it. The retroreflective target rod 10 is placed in the paths of the beams of green and red laser light. The retroreflective target rod 10 has retroreflective material 18 over substantially its entire length, making the rod 10 useful for layout work at a worksite in which the elevation may change significantly over the site. The transmitter 12 senses the reflection of the beams 16 and 28 from the target rod to the transmitter 12 and transmits wirelessly to the remote control an indication that the target rod is in the path of the beams. The transmitter further transmits to the remote control 14 the distance between the transmitter and the target rod and the heeding from the transmitter to the target rod. The laser transmitter additionally transmits an indication of the distance and direction that the target rod is to be moved to reach the position to be located. After the target rod is moved to the position to be located, the laser transmitter 12 wirelessly transmits an indication of this to the remote control device 14. The process is then repeated to locate each of the other positions instructions are transmitting wirelessly to the laser transmitter 12 from the remote control device 14, identifying additional ones of the plurality of positions. The operator moves the retroreflective target rod 10 to the additional ones of the plurality of positions using the beams from the laser transmitter to direct such movement, and to confirm when the retroreflective target rod 10 reaches each of those additional positions. As explained, above, the transmitter 12 will sweep the beams of laser light book and forth over a limited range as the target rod 10 is moved, permitting the rod 10 to be tracked. The operator may use the scale markings on the laser target rod 10 to determine the elevation of the end of the rod in relation to the elevation of the beam of laser light.

The layout equipment may also be used to determine relative locations of various points in a previously bunt structure. For this purpose, the transmitter 12 is located at a predetermined position in the structure, and the target rod is moved to each location to be measured. For each location, the transmitter 12 wirelessly transmits the distance and heading to the controller 14. This information, along with the elevation information read from the scale markings on the rod 10, is then recorded, providing an indication of the relative position of the location. It will be appreciated that the transmitter 12 must be located at a position in the structure affording a line of sight access to each of the positions to be located.

Figure 5:
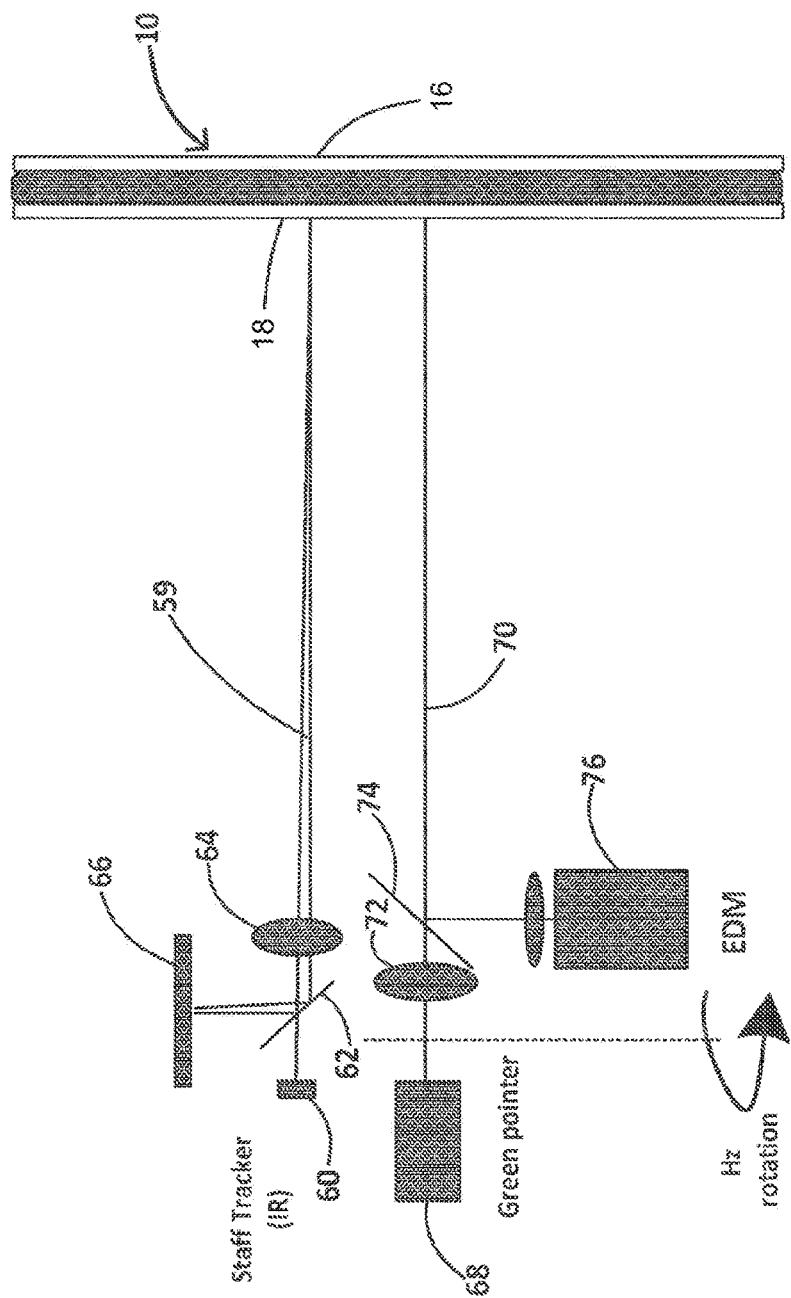
FIG. 5 is a diagrammatic illustration of another embodiment of the layout equipment.

FIG. 5 illustrates diagrammatically a second embodiment of the laser transmitter 12. In this embodiment, the tracking of target rod 10 is accomplished with an infrared laser beam 59 which is produced by IR laser 60, directed through reflector 62 and lens arrangement 64 to target rod 10. IR light returning from target rod 10 is reflected by reflector 62 to IR detector 66. As described previously, the transmitter of FIG. 5 remains locked on target rod 10, rotating slightly from side to side, as needed, to reacquire the rod 10. Green laser 68 provides a beam 70 of green laser light which passes through lens arrangement 72 and reflector 74 to illuminate the target rod 10. The operator can easily read the elevation of the beam 70, indicated by the measurement markings on the rod 10. The beam 70 of green laser light may also be the basis for determining the distance from the transmitter 12 to the target rod 10 by measuring the time of flight of the beam 70 to and from the target rod with an EDM module 76 in the transmitter 12.

Figure 6:
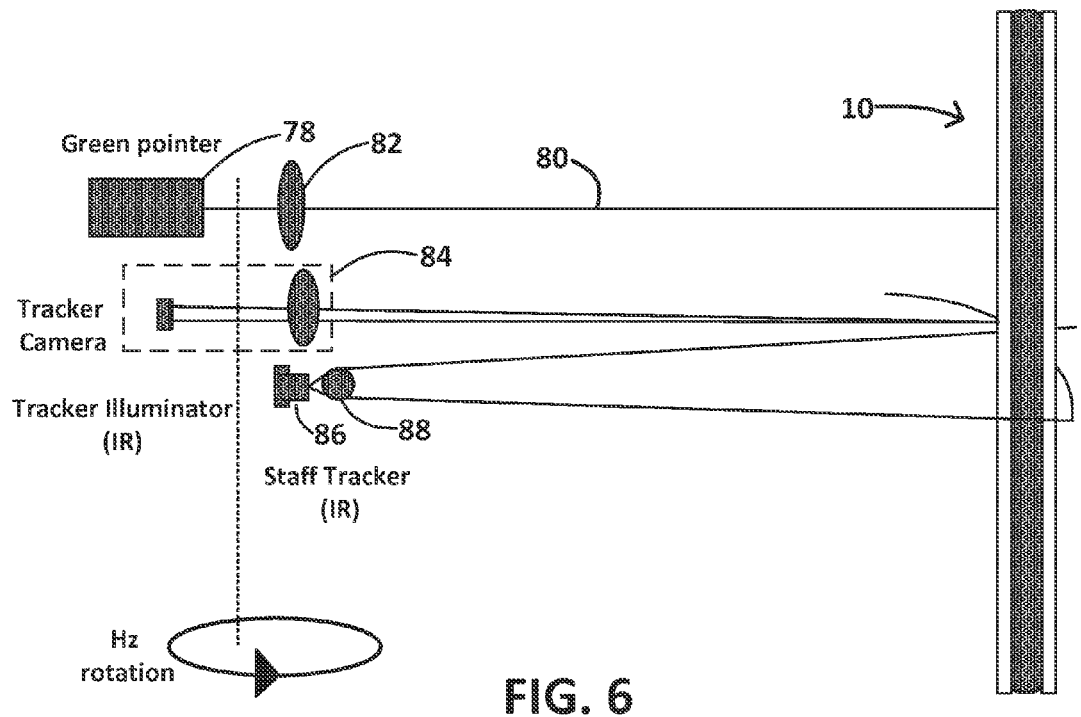
FIG. 6 is a diagrammatic illustration of yet another embodiment of the layout equipment.

FIG. 6 illustrates diagrammatically a third embodiment of the laser transmitter 12. In this embodiment, a green laser 78 provides a green beam of laser light 80 via lens 82 to illuminate the target rod 10 and permit the elevation to be read from the rod 10 by the operator. Tracking of the rod is accomplished by a tracker camera 84 which includes appropriate optics and a photosensor array that provides a digitized image to the digital controller 34 for processing. An infrared source 86 and optics 88 may be provided to illuminate the target rod 10, as illustrated, and facilitate the operation of the tracker camera 84.

What is claimed is:

1. Layout equipment for locating a plurality of positions at a construction site, comprising:
   a laser target rod having an elongated rod body including retroreflective material on the elongated rod body, the retroreflective material extending substantially an entire length of the elongated rod body, and scale markings visible on the laser target rod,
   a self-leveling laser transmitter for projecting a first beam of laser light and a second beam of laser light parallel to the first beam of laser light, and for receiving laser light reflected from the laser target rod, the laser transmitter including a first wireless communication unit, and a transmitter control, wherein the transmitter control is responsive to the first wireless communication unit, wherein the beam of laser light is a beam of green laser light, and wherein the second beam of laser light is reflected from the laser target rod and detected by the laser transmitter such that a distance between the laser transmitter and the laser target rod is determinable through time-of-flight calculation, and
   a remote control device, including a second wireless communication unit, for wirelessly communicating with the laser transmitter to cause the laser transmitter to project the beam of laser light toward a selected one of the plurality of positions at the construction site, and for signaling a user of the layout equipment when the laser target rod has been placed at the selected one of the plurality of positions.

2. The layout equipment of claim 1, in which the second beam of laser light is a collimated beam of red laser light.

3. The layout equipment of claim 1, in which the self-leveling laser transmitter illuminates the laser target rod as the laser target rod is moved to different locations at the construction site, whereby the transmitter control determines a heading and distance from the self-leveling laser transmitter to the laser target rod, and in which the transmitter control communicates the heading and the distance to the remote control device.

4. The layout equipment of claim 1, in which the self-leveling laser transmitter sweeps the beam of laser light back and forth across a surface of the laser target rod in a horizontal plane such that a position of the laser target rod is monitorable as the laser target rod is moved across the construction site.

5. The layout equipment of claim 1, in which the scale markings on the laser target rod delineate distances of the scale markings with respect to one or both ends of the laser target rod.

6. The layout equipment of claim 1, in which the remote control device wirelessly communicates to the laser transmitter an instruction for the laser transmitter to direct the beam of laser light along a heading toward the selected one of the plurality of positions and in which the remote control device provides an indication when the laser target rod is located at the selected one of the plurality of positions.

7. Layout equipment for determining a position of a laser target rod at a construction site, comprising:
   the laser target rod having an elongated rod body including retroreflective material on the elongated rod body, the retroreflective material extending substantially an entire length of the elongated rod body, and scale markings visible on the laser target rod,
   a laser transmitter for projecting a beam of green laser light and a beam of infrared laser light, whereby an area of illumination of the laser target rod is observable by an operator, the laser transmitter including a first wireless communication unit, and a transmitter control that is responsive to the first wireless communication unit, the laser transmitter further including a camera for tracking an image of the laser target rod such that the beam of green laser light is continuously directed to the laser target rod, and wherein the camera is sensitive to infrared laser light reflected from the retroreflective material on the laser target rod such that the beam of infrared laser light is continuously directed to the laser target rod, and
   a remote control device, including a second wireless communication unit, for wirelessly communicating with the laser transmitter to cause the laser transmitter to project the beam of laser light toward a selected position at the construction site, for signaling the operator when the laser target rod has been placed at the selected position, and for providing an indication of the position of said laser target rod at the construction site.

8. The layout equipment of claim 7, in which the laser transmitter sweeps both the beam of infrared laser light and the beam of green laser light back and forth across a surface of the laser target rod such that the position of the laser target rod may be monitored as the laser target rod is moved across the construction site.

9. The layout equipment of claim 7, in which the laser transmitter is self-leveling.

10. The layout equipment of claim 7, in which the laser transmitter illuminates the laser target rod as the laser target rod is moved to different locations at the construction site, whereby the laser transmitter determines a heading to the laser target rod, and in which the laser transmitter communicates the heading to the remote control device.

11. The layout equipment of claim 7, in which the retroreflective material on the laser target rod defines a plurality of stripes that produce a reflective pattern of light that is characteristic of the laser target rod when light is swept across the laser target rod.

12. A layout method for locating a plurality of positions at a construction site using layout equipment, comprising:

positioning a single laser transmitter at a known position at the construction site;

wirelessly transmitting an instruction to the single laser transmitter from a remote control device, the instruction identifying a position to be located;

projecting a first beam of first laser light and a second beam of second laser light horizontally from the laser transmitter on a heading toward the position to be located, wherein the first beam and the second beam are parallel to each other, the first laser light and the second laser light having different colors;

placing a laser target rod having an elongated body including retroreflective material on the elongated body, the retroreflective material extending substantially an entire length of the elongated body;

sensing a reflection of the beams from the laser target rod to the single laser transmitter;

wirelessly transmitting to the remote control from the single laser transmitter a first indication that the laser target rod is in a path of the beams;

wirelessly transmitting to the remote control from the laser transmitter a first distance between the single laser transmitter and the laser target rod, and a second distance and direction which the laser target rod is to be moved to reach the position to be located;

moving the laser target rod toward the position to be located; and wirelessly transmitting to the remote control from the laser transmitter a second indication that the laser target rod had reached, and is located at, the position to be located.

13. The layout method as recited by claim 12, wherein the placing of the laser target rod having the elongated body including retroreflective material on the elongated body further comprises:

placing the laser target rod having scale markings visible on the laser target rod; and determining distances from one or both ends of the laser target rod based on the first beam of the first laser light.

14. The layout method as recited by claim 12, wherein the method further comprises:

projecting the beams from the single laser transmitter toward a selected one of the plurality of positions at the construction site; and transmitting a signal from the remote control device to a user of the layout equipment when the laser target rod has been placed at the selected one of the plurality of positions.

15. The layout method of claim 12, wherein the method further comprises:

determining the first distance between the single laser transmitter and the laser target rod based on a time of flight of the second beam of the second laser light.

16. The layout method of claim 12, wherein the method further comprises:

wirelessly transmitting instructions to the single laser transmitter from the remote control device;

identifying additional ones of the plurality of positions; and moving the laser target rod to the additional ones of the plurality of positions;

directing such movement based on the beams from the single laser transmitter; and confirming that the laser target rod is located at each of the additional ones of the plurality of positions based on the beams from the single laser transmitter.

17. The layout method of claim 12, wherein the method further comprises:

wirelessly communicating the instructions from the remote control device to the single laser transmitter, wherein the instructions direct the beams along the heading toward the position; and transmitting the second indication from the remote control device when the laser target rod is positioned at the position.

* * * * *